June 10, 1941.  D. L. WOOD  2,245,241

LENS MOUNT AND METHOD OF ASSEMBLING THE SAME

Filed Jan. 12, 1939

DONALD L. WOOD
INVENTOR

BY Newton M Perrins
Donald H Stewart
ATTORNEYS

Patented June 10, 1941

2,245,241

UNITED STATES PATENT OFFICE 2,245,241

LENS MOUNT AND METHOD OF ASSEMBLING THE SAME

Donald L. Wood, Rochester, N. Y., assignor to Eastman Kodak Company, Rochester, N. Y., a corporation of New Jersey Application January 12, 1939, Serial No. 250,587

6 Claims. (Cl. 88—57)

This invention relates to photography and more particularly to focusing objectives.

One object of my invention is to provide an inexpensive and accurate mount for the elements of an objective of the type in which one element is moved relative to another element to focus the camera. Another object of my invention is to provide a means for focusing the entire objective relatively to the camera and for properly positioning the focusing scale carried by the movable part of the objective. Still another object of my invention is to provide a focusing mount in which the movable objective element is carried on a threaded connection and in which an annular sleeve member which may carry a part of the focusing scale obscures the threaded connection of the mount, retards dirt entering into the threaded area and provides an adjustment for initially assembling the lens on a camera. Other objects will appear from the following specification, the novel features being particularly pointed out in the claims at the end thereof.

It is well known that certain types of objectives may consist of a plurality of lens elements and that one of the lens elements may be moved relative to the other for focusing the entire objective. This type of focusing has been particularly desirable with many of the modern self-erecting front cameras because the camera shutter carrying the objective can be readily mounted in a fixed position with relation to the focal plane.

However, such lenses have had certain disadvantages, notably the difficulty of obtaining an inexpensive mount which would hold the lens elements with sufficient accuracy to produce the desired results and because of the difficulty of initially focusing the objective on the camera. It has been customary in the past to shift the entire objective during the focusing operation at the factory until the proper relationship of the parts has been obtained, and it has then been customary to remove the removable lens mount and properly engrave a focusing scale on the cell which is turned to focus the objective. This necessitates considerable hand work and has been found to be extremely expensive.

It might also be pointed out that one of the most desirable types of focusing lenses—the so-called Cooke type—which consists of three lens elements, the front element alone being moved relative to the rear elements for spacing, is particularly sensitive to inaccurate mounting as it is necessary to have the elements very carefully spaced and accurately positioned along the axis of the objective to obtain the best results.

In the method and mount which I have designed, most of these difficulties have been entirely overcome, or at least minimized to a large extent.

Coming now to the drawing wherein like reference characters denote like parts throughout:

Figure 1:
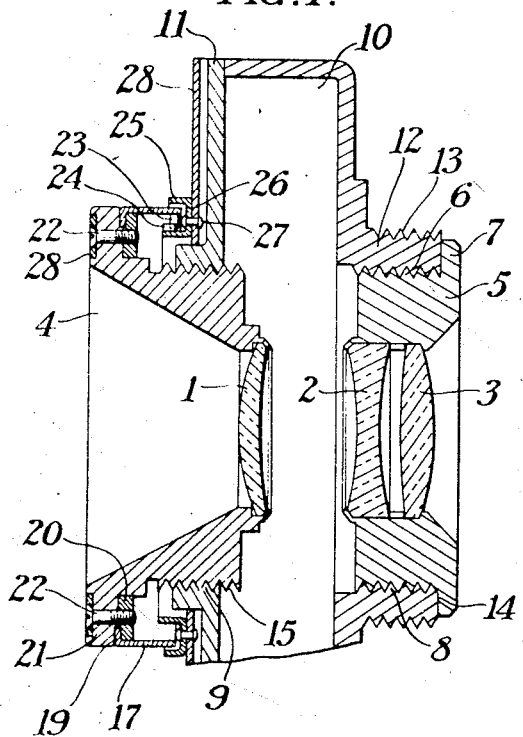
Fig. 1 is a fragmentary sectional view through a focusing objective mount constructed in accordance with and embodying a preferred form of my invention.
Figure 2:
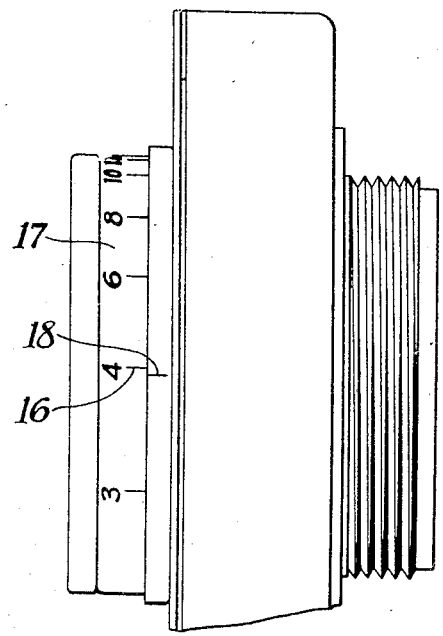
Fig. 2 is a view similar to Fig. 1, except that parts of the shutter and mount are shown in elevation.

As indicated in Fig. 1, the objective may be of the Cooke type in which there are three lens elements 1, 2 and 3, the former being mounted in a cell 4 forming one part of the objective, and lenses 2 and 3 being fixedly mounted in a cell 5 forming a second part of the objective. With this type of focusing objective, cell 4 is moved relative to cell 5 for focusing the objective at various focal distances.

In the embodiments shown in the first three figures, cell 5 is provided with a threaded area 6 terminating in a shoulder 7 so that this cell may be screwed into a threaded area 8 of any form of lens barrel. In the present instance, the lens barrel consists of the threaded areas 8 and 9 which are shown as being the lens tubes of a shutter casing 10, the mechanism of which is not shown. The threaded area 9 is carried on the shutter front plate 11 in axial alinement with the threaded area 8 carried on the rearwardly extending lens tube 12. As is customary with shutters of this type, the lens tube 12 is also threaded at 13 for attachment to the lens board of a camera. In the following specification and claims, lens tube and shutter are used interchangeably, since it is obvious that my invention is equally applicable to either an objective mounted only in a lens tube which may be used with a focal plane or other shutter which does not intercept light at the objective or to a camera employing the usual type of between-the-lens shutter. Such a shutter is illustrated by way of example.

In the form of my invention shown in the first three figures, the rear lens cell is fixedly positioned with respect to the lens barrel 12 by screwing it down until the flange 7 is seated on the end 14 of the lens tube. The shutter has preferably already been definitely positioned in a camera with respect to the focal plane so that in order to properly position the objective as a whole, the lens cell 4 must be properly positioned on the shutter.

This is done by screwing the threaded area 15 of the lens cell 4 into the threaded area 9 while focusing on a target at a suitable unit distance. When the image becomes sharp at the focal plane, the lens cell 4 will be in the proper position and it is then necessary to adjust a focusing scale 16 carried by an annular member 17 to its proper relation with a pointer 18 which will indicate the focal setting of the objective. In the present instance, the annular member 17, as indicated in Fig. 1, is provided with an inwardly formed flange 19 which is preferably held beneath one edge of a pinch ring 20, this ring being carried on a shoulder 21 on the lens cell 4 and being attached thereto by a plurality of screws 22. The shoulder 21 and the pinch ring thus provide an adjustable slideway in which the flange 19 is positioned, as clearly illustrated in Fig. 1. If desired, two screws may be used, as I have found that this satisfactorily holds the pinch ring in place. By tightening up on the screws 22 after the proper graduation on the scale 16 has been brought into registration with the pointer 18 while carefully holding the front cell 4 against movement, the scale is properly positioned. The inner edge of the annular member 17 not only carries the focusing scale, but in addition is provided with a downwardly extending stop 23 which, by striking a lug 24, holds the lens cell 4 to a movement somewhat less than 360°.

The threads 9 and 15 are selected so that less than one complete revolution of the lens cell 4 will move the lens 1 relative to lenses 2 and 3 a distance sufficient to cover the entire range of focusing movement of the camera which may be from three feet to infinity, or whatever may be found to be desirable.

The annular member 17 is so arranged that it may lie beneath the flange 25 of a U-shaped annular member 26 which may be attached to the decorative front plate 28 of the shutter as by rivets 27. By having the annular member 17 extend beneath this flange, it forms a satisfactory dust-proof cap which prevents dust from entering into the mating threads 9 and 15 and at the same time it provides a neat exterior appearance to the focusing lens. In addition, the flange 25 forms a convenient place for the pointer 18, although if this flange is made wide enough, the focusing scale may be placed on the flange and the pointer may be placed on the annular member 17. However, it is more desirable to have the pointer on the fixed member so that the user can always view the pointer and scale from one viewpoint.

Figure 3:
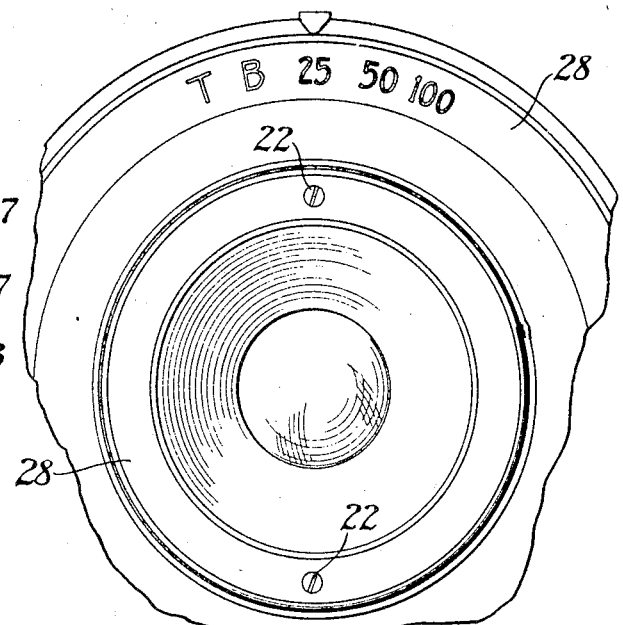
Fig. 3 is a fragmentary front plan view of the shutter shown in the preceding views.

In addition, the screws 22, as indicated in Fig. 3, may hold a plate 28ª of annular shape on the front of the lens cell 4 so as to further reduce the cost of the objective mount and at the same time to carry the maker's name, the lens name, the focal length and aperture of the objective in the form of an etched plate. This data is usually engraved on the front lens cell of an objective and the engraving operation alone is quite a costly one. Thus, if desired, the annular member 17 and the ring 28ª may both be etched plates to materially reduce the cost of the parts bearing necessary or desirable data concerning the objective.

While the threaded areas 9 and 15 are quite substantial in length, the actual movement of the cell 4 relative to the shutter 10 is comparatively slight since, as above explained, the threads are selected so that less than one revolution accomplishes the complete focusing movement. However, these threads, together with their mating threads 6 and 8, must be extremely accurately made to obtain the best results.

It will be noted with the construction shown in the first three figures that the threaded areas are definitely reduced to a minimum and that only two sets of mating threads are used in the completely mounted focusing objective.

While an additional thread 13 is provided, this is merely for fastening the shutter on a camera and does not form a part of the focusing objective itself.

Figure 4:
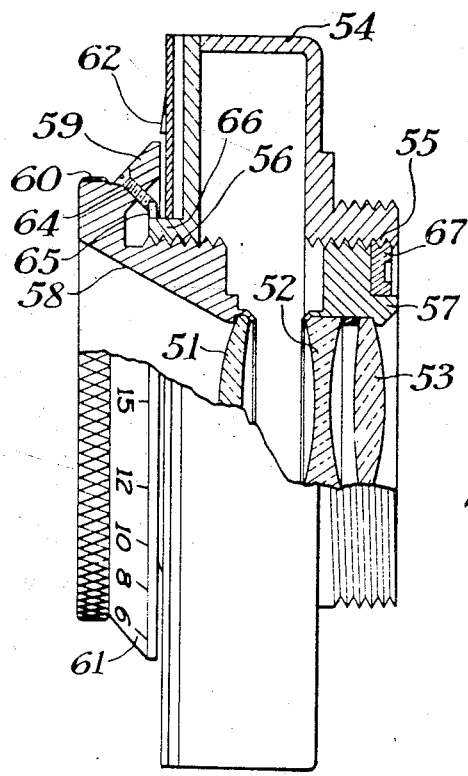
Fig. 4 is a part section and part side elevation of a second embodiment of my invention.

I have found still an additional way of greatly reducing the cost of focusing lens mounts by reducing the number of parts to a minimum, such a mount being illustrated in Fig. 4. In this figure, the lens elements may be the same as before and are indicated at 51, 52, and 53. The shutter 54 may be provided with the internal threads 55 and 56 for receiving the lens cells 57 and 58, these cells being somewhat different from the construction shown in the first figure. In this embodiment of my invention, the front cell 58 is one piece and is provided with a beveled shoulder 59 adjacent a knurling 60, there being a focusing scale 61 on the beveled surface 59. In setting up this objective, the shutter is first mounted in a fixed position with respect to the focal plane of a camera and the cell 58 is screwed into the thread 56 until a focal distance marking of the scale 61 is brought opposite to a pointer 62. I have found that focusing initially upon twenty-five feet is entirely suitable, although any other focal distance desired may be used for the purpose. The front cell having been positioned, a screw 64 may be passed through the flange 59 so that it will strike both sides of a lug 65 formed from the threaded collar 66 to form a stop limiting the movement of this cell to less than one complete revolution.

The rear lens cell 57 is then screwed into place and is moved by means of a suitable tool until an object at unit distance is brought into sharp focus at the focal plane. This lens cell may then be readily fastened in position by screwing in a lock nut 67 which may, if desired, be first wiped with shellac or other varnish to definitely hold the parts in a set position.

This form of my invention has the advantage of reducing the number of parts of the front lens cell to one, whereas in the first form, the annular member 17, the pinch ring 20, the U-shaped annular member 25 and the screws 22 are all necessary and the decorative plate 28 may also be used. However, the lens cell 58 is somewhat more expensive because of the fact that it is necessary to engrave the lens scale 61 on the flange 59. This offsets for some of the added cost of the extra parts of the first-described embodiment of my invention.

It will be noticed that with each embodiment of my invention, the factory adjustment for focusing the objective is done by fixedly mounting the shutter with respect to the focal plane of the camera and then by fixedly positioning one lens element in the shutter so positioned. In the form shown in Fig. 1, the rear part of the objective carried by the lens cell 5 is fixedly positioned, while in the form shown in Fig. 4, the single lens element in cell 58 is fixedly positioned—that is to say, it is fixedly positioned in that it is merely moved into a definite position which is predetermined by the scale marking and the corresponding pointer.

In each case, the remaining portions of the objective are moved back and forth until a definite focal point is sharply focused on the focal plane of the camera. In Fig. 1, it is the front lens cell 4 which is moved, and in Fig. 4 it is the rear lens cell 57. In both forms of my invention it is only necessary to provide two sets of threads which mate and which must be accurately cut, and consequently the cost of such a lens is materially reduced because heretofore a number of extra sets of threads have been required because it has usually been found necessary to focus the movable lens element by moving it on the cell of another lens element in order to get the necessary degree of accuracy and in order to initially focus the complete objective on a camera.

What I claim is:

1. A mount for focusing objectives comprising a barrel having spaced threaded areas in axial alignment, a pair of lens cells having direct threaded engagement with the threaded areas of the lens mount, one of said cells being adjustable axially relative to said mount and said other cell, an annular member formed with an inwardly extending radial flange and carrying a focusing scale, a slideway on said adjustable lens cell adapted to receive said flange and means carried by the lens cell adjacent the slideway for holding the flange in a fixed position in its slideway.

2. A mount for focusing objectives comprising a barrel having spaced threaded areas in axial alignment, a pair of lens cells having direct threaded engagement with the threaded areas of the lens mount, an inwardly flanged annular member carrying a focusing scale, an adjustable slideway including a movable pinch ring carried by one of said lens cells and adapted to receive the flange of said annular member, and means on said one cell for drawing said ring against said flange to retain the annular member in fixed position on said one cell.

3. A mount for focusing objectives comprising a barrel having spaced threaded areas in axial alignment, a pair of lens cells having direct threaded engagement with the threaded areas of the lens mount, an inwardly flanged annular member carrying a focusing scale, a slideway on one of said lens cells comprising a fixed member and an adjustable member between which the flange of said annular member is positioned, means on said fixed member engaging said movable member to draw the latter toward said fixed member to clamp said flange to hold said annular member in fixed position on said lens cell and a flanged annular member carried by the lens barrel partially telescoping the focusing scale carrying annular member.

4. A mount for focusing objectives comprising a barrel having spaced threaded areas in axial alignment, a pair of lens cells having threaded engagement with the threaded areas of the lens mount, an inwardly flanged annular member carrying a focusing scale, a slideway on one lens cell carrying the annular member, and means for holding the flange in a fixed position in its slideway including a pinch ring carried by the lens cell, an annular plate on said lens cell, and screws passing through the annular plate, lens cell and engaging said pinch ring for holding the annular focusing scale carrying plate in a fixed position on said lens cell.

5. A focusing objective mount for cameras comprising a lens barrel, two sets of accurately cut threads spaced apart and axially positioned carried by the lens barrel, two threaded lens cells, one fixedly and one movably attached directly to the threaded areas of the lens barrel, means for limiting the movement of the movable lens cell on the barrel, said two sets of threads on the lens barrel and the threads on the lens cells mating therewith forming the sole means for supporting the fixed and movable lens cells constituting the focusing objective.

6. A mount for focusing objectives comprising a lens barrel formed with internally threaded cylindrically cell receiving portions arranged in axial alignment, a lens cell having direct threaded engagement with and arranged in fixed position in one of said portions, a second cell arranged in optical alignment with said first cell and having a direct threaded engagement with the other of said portions so as to be supported solely by said other portion, said second cell being movable along the threads of said last mentioned portion to focus said mount, a member carrying a focusing scale, a shoulder formed on said second cell, a pinch ring, a flange on said member positioned between said shoulder and ring, and means carried by said shoulder for connecting said ring to and for drawing it toward said shoulder to clamp said flange to hold said scale in fixed relation with said second scale.

DONALD L. WOOD.